(12) United States Patent
Jasper et al.

(10) Patent No.: US 10,723,951 B2
(45) Date of Patent: Jul. 28, 2020

(54) NAPHTHALENE COMPOUNDS FOR LIQUID-CRYSTALLINE MIXTURES

(71) Applicant: MERCK PATENT GMBH, Darmstadt (DE)

(72) Inventors: Christian Jasper, Seligenstadt (DE); Susann Gunst, Darmstadt (DE); Helmut Haensel, Muehltal (DE); Brigitte Schuler, Grossostheim (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 15/781,602

(22) PCT Filed: Nov. 24, 2016

(86) PCT No.: PCT/EP2016/001981
§ 371 (c)(1),
(2) Date: Jun. 5, 2018

(87) PCT Pub. No.: WO2017/097400
PCT Pub. Date: Jun. 15, 2017

(65) Prior Publication Data
US 2018/0371320 A1    Dec. 27, 2018

(30) Foreign Application Priority Data
Dec. 9, 2015   (EP) .................... 15198620

(51) Int. Cl.
*G02F 1/1333* (2006.01)
*C09K 19/32* (2006.01)
*C09K 19/12* (2006.01)

(52) U.S. Cl.
CPC .......... *C09K 19/322* (2013.01); *C09K 19/12* (2013.01); *C09K 2019/122* (2013.01)

(58) Field of Classification Search
CPC ............. C09K 19/322; C09K 19/12; C09K 2019/122; G02F 1/1333
USPC ..................... 252/299.62
See application file for complete search history.

(56) References Cited

U.S. PATENT DOCUMENTS

| | | | |
|---|---|---|---|
| 5,942,648 A | 8/1999 | Coates | |
| 7,145,047 B2 * | 12/2006 | Takehara | C07C 17/263 570/183 |
| 7,790,915 B2 * | 9/2010 | Kondou | C09K 19/322 252/299.67 |
| 2007/0051919 A1 | 3/2007 | Kondou | |

FOREIGN PATENT DOCUMENTS

| | | |
|---|---|---|
| EP | 952135 A1 | 10/1999 |
| EP | 1762605 A1 | 3/2007 |
| JP | 2000109843 A | 4/2000 |

OTHER PUBLICATIONS

International Search Report PCT/EP2016/001981 dated Feb. 15, 2017.

* cited by examiner

*Primary Examiner* — Geraldina Visconti
(74) *Attorney, Agent, or Firm* — Millen, White, Zelano & Branigan, PC; Ryan Pool

(57) ABSTRACT

The invention relates to compounds of the formula I,

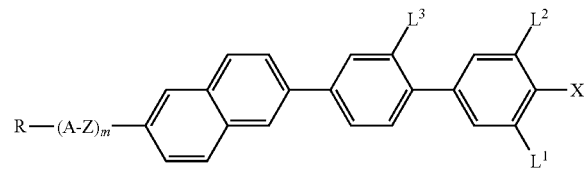

in which
R, A, Z, m, $L^1$, $L^2$, $L^3$ and X have the meanings indicated in Claim 1, to a process for the preparation thereof, and to liquid-crystalline media comprising at least one compound of the formula I and to electro-optical displays containing a liquid-crystalline medium of this type.

13 Claims, No Drawings

NAPHTHALENE COMPOUNDS FOR LIQUID-CRYSTALLINE MIXTURES

The invention relates to compounds of the formula I, as defined below, to a process for their preparation, to liquid-crystalline media comprising at least one compound of the formula I, and to the use thereof as component(s) in liquid-crystalline media. In addition, the present invention relates to liquid-crystal and electro-optical display elements which contain the liquid-crystalline media according to the invention. The compounds according to the invention contain, as structural elements, a 2,6-substituted naphthalene group besides a characteristically substituted biphenyl group.

In previous years, the areas of application of liquid-crystalline compounds have been considerably expanded to various types of display devices, electro-optical devices, electronic components, sensors, etc. For this reason, a number of different structures have been proposed, in particular in the area of nematic liquid crystals. The nematic liquid-crystal mixtures have to date found the broadest use in flat-panel display devices. They have been employed, in particular, in passive TN or STN matrix displays or systems having a TFT active matrix.

The liquid-crystalline compounds according to the invention can be used as component(s) of liquid-crystalline media, in particular for displays based on the principle of the twisted cell, the guest-host effect, the effect of deformation of aligned phases DAP or ECB (electrically controlled birefringence), the IPS (in-plane switching) effect or the effect of dynamic scattering.

The use of certain derivatives containing a naphthalene ring as liquid-crystalline substances is known to the person skilled in the art. Various compounds containing a naphthalene ring have already been described as liquid-crystalline material, as has the preparation thereof, such as, for example, in the specifications U.S. Pat. No. 5,942,648, JP 2000-109843 A and US 2007/0051919 A1.

The present invention was based on the object of finding novel stable compounds which are suitable as component(s) of liquid-crystalline media.

In particular, the compounds should simultaneously have comparatively low viscosity and high optical anisotropy. For many current mixture concepts in the area of liquid crystals, it is advantageous to use compounds having positive dielectric anisotropy $\Delta\varepsilon$ in combination with high optical anisotropy.

In view of the very wide variety of areas of application of compounds of this type having high $\Delta n$, it was desirable to have available further compounds, preferably having high nematogeneity, which have properties which are precisely tailored to the respective applications.

The invention was thus based firstly on the object of finding novel stable compounds which are suitable as component(s) of liquid-crystalline media, in particular for, for example, TN, STN, IPS and TN-TFT displays.

A further object of the present invention was to provide compounds which, per se or in mixtures, have high optical anisotropy $\Delta n$, a high clearing point and low rotational viscosity $\gamma_1$. In addition, the compounds according to the invention should be thermally and photochemically stable under the conditions prevailing in the areas of application. Furthermore, the compounds according to the invention should if possible have a broad nematic phase. As mesogens, they should facilitate a broad nematic phase in mixtures with liquid-crystalline co-components and be readily miscible with nematic base mixtures, in particular at low temperatures. Preference is likewise given to substances having a low melting point and a low enthalpy of melting, since these quantities are in turn a sign of the desirable properties mentioned above, such as, for example, high solubility, a broad liquid-crystalline phase and a low tendency towards spontaneous crystallisation in mixtures at low temperatures. In particular, the solubility at low temperature while avoiding any crystallisation is important for safe operation and transport of displays in vehicles and aircraft and outdoors.

Surprisingly, it has been found that the compounds according to the invention are eminently suitable as components of liquid-crystalline media. They can be used to obtain liquid-crystalline media for displays which require particularly high dielectric anisotropies, in particular for TN-TFT and STN displays, but also for IPS systems or more recent concepts. The compounds according to the invention are adequately stable and colourless. They are also distinguished by high optical anisotropies $\Delta n$, owing to which lower layer thicknesses and thus lower threshold voltages are necessary when used in optical switching elements. They have very good solubility for compounds having comparable properties. In addition, the compounds according to the invention have a high clearing point and at the same time low values for the rotational viscosity. Compared with substances from the prior art, significantly lower melting points and enthalpies of melting are observed.

The provision of the compounds according to the invention very generally considerably broadens the range of liquid-crystalline substances which are suitable, from the various applicational points of view, for the preparation of liquid-crystalline mixtures.

The compounds according to the invention have a broad range of applications. Depending on the choice of substituents, these compounds can serve as base materials of which liquid-crystalline media are predominantly composed. However, it is also possible to add liquid-crystalline base materials from other classes of compound to the compounds according to the invention in order, for example, to influence the dielectric and/or optical anisotropy of a dielectric of this type and/or to optimise its threshold voltage and/or its viscosity.

The invention thus relates to compounds of the formula I,

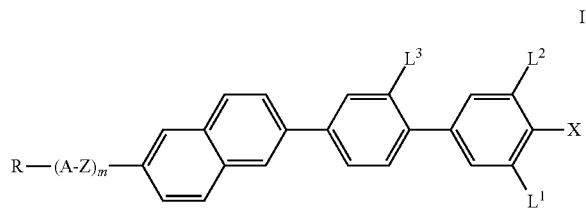

in which
X denotes F, Cl, Br, CN, CF$_3$, OCF$_3$, NCS, SCN, SF$_5$, a halogenated alkyl radical having 1 to 7 C atoms, where, in addition, one or more CH$_2$ groups in this radical may each be replaced, independently of one another, by —C≡C—, —CH=CH—, —CF=CF—, —CF=CH—, —CH=CF—, —(CO)—, —(CO)O— and —O— in such a way that O atoms are not linked directly to one another,
R denotes a halogenated or unsubstituted alkyl radical having 1 to 15 C atoms, where, in addition, one or more CH$_2$ groups in these radicals may each be replaced, independently of one another, by —C≡C—, —CH=CH—, —(CO)O—, —O(CO)—, —(CO)— or —O— in such a way that O atoms are not linked directly to one another, or a polymerisable radical, A denotes
a) trans-1,4-cyclohexylene or cyclohexenylene, in which, in addition, one or more non-adjacent CH$_2$ groups may be replaced by —O— and/or —S— and in which H may be substituted by F,
b) 1,4-phenylene, in which one or two CH groups may be replaced by N and in which, in addition, one or more H atoms may be replaced by Br, Cl, F, CN, methyl, methoxy or a mono- or polyfluorinated methyl or methoxy group, Z denotes a single bond, —CH$_2$O—, —(CO)O—, —CF$_2$O—, —CH$_2$CH$_2$CF$_2$O—, —CF$_2$CF$_2$—, —CH$_2$CF$_2$—, —CH$_2$CH$_2$—, —(CH$_2$)$_4$—, —CH=CH—, —CH=CF—, —CF=CF— or —C≡C—, where asymmetrical bridges may be oriented to both sides, L$^1$, L$^2$ and L$^3$, independently of one another, denote H or F, and m denotes 0 or 1, preferably 0.

The invention furthermore relates to the use of the compounds of the formula I in liquid-crystalline media.

The present invention likewise relates to liquid-crystalline media having at least two liquid-crystalline components which comprise at least one compound of the formula I.

The compounds of the formula I have a broad range of applications. Depending on the choice of substituents, these compounds can serve as base materials of which liquid-crystalline media are predominantly composed; however, it is also possible to add liquid-crystalline base materials from other classes of compound to the compounds of the formula I in order, for example, to influence the dielectric and/or optical anisotropy of a dielectric of this type and/or to optimise its threshold voltage and/or its viscosity.

In the pure state, the compounds of the formula I are colourless and, per se or in mixtures, form liquid-crystalline mesophases in a temperature range which is favourably located for electro-optical use. The compounds according to the invention enable broad nematic phase ranges to be achieved. In liquid-crystalline mixtures, the substances according to the invention significantly increase the optical anisotropy and/or result in an improvement in the low-temperature storage stability compared with comparable compounds having high dielectric anisotropy. At the same time, the compounds are distinguished by improved UV stability compared with known materials from the prior art which contain a bridging element (for example —C≡C— or —CF=CF—) between the rings.

Z, if present, preferably denotes a single bond, —CF$_2$O—, —OCF$_2$—, —C$_2$F$_4$—, —CH$_2$O—, —OCH$_2$—, —C≡C— or —(CO)O—, in particular a single bond.

A preferably denotes

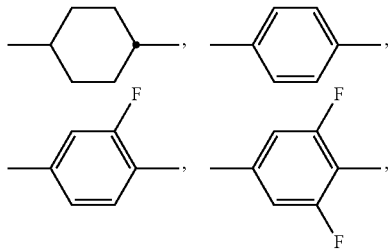

and furthermore

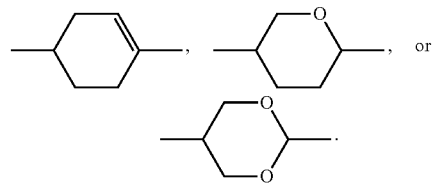

R preferably denotes alkyl, alkoxy, alkenyl or alkenyloxy having up to 8 carbon atoms or a polymerisable radical. R particularly preferably denotes unbranched alkyl or alkenyl.

Compounds of the formula I containing branched or substituted wing groups R may occasionally be of importance owing to better solubility in the conventional liquid-crystalline base materials. The group R is preferably straight-chain.

R may represent a polymerisable radical. The expression "polymerisable radical" covers, in particular, a group of the formula —(Sp)$_r$-P, in which
Sp represents a so-called spacer, i.e., in particular, alkylene having 1-15 C atoms, in which one or more —CH$_2$— may be replaced by —O—, —CO—, —O(CO)— or —(CO)O— in such a way that two oxygen atoms are not adjacent,
r denotes 0 or 1, preferably 0, and
P denotes a polymerisable group, preferably acryloyl, methacryloyl, fluoroacryloyl, chloroacryloyl, oxetanyl, epoxy, vinyl, vinyloxy, propenyloxy or styryl, in particular acryloyl or methacryloyl.

The polymerisable group P is a group which is suitable for a polymerisation reaction, for example free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or a C≡C triple bond, and groups which are suitable for ring-opening polymerisation, such as, for example, oxetanyl or epoxy groups.

The term "spacer" or "spacer group", also called "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group P to one another in a polymerisable mesogenic compound.

Compounds of the formula I which contain wing groups R that are suitable for polymerisation reactions are suitable for the preparation of polymerisable liquid-crystalline mixtures and of resultant liquid-crystalline polymers and of polymer-stabilised liquid-crystalline media.

An interesting application of polymerisable compounds is so-called PS (polymer stabilised) displays, which are also known under the term "PSA" (polymer sustained alignment). In these, a small amount (for example 0.3% by weight, typically <1% by weight) of a polymerisable compound is added to the liquid-crystalline medium and, after introduction into the liquid-crystal cell, is polymerised or crosslinked in situ in the desired liquid-crystalline alignment (for example by means of an applied electric voltage between the electrodes). The polymerisation is usually carried out by UV photopolymerisation. The addition of polymerisable mesogenic or liquid-crystalline compounds, also known as reactive mesogens or "RMs", to the liquid-crystalline mixture has proven particularly suitable.

The invention therefore furthermore relates to the use of polymerisable compounds of the formula I for polymer stabilisation of a liquid-crystalline medium, and to a liquid-crystalline medium comprising one or more polymerisable compounds of the formula I and one or more additional compounds, which may also be mesogenic, liquid-crystalline and/or polymerisable.

The substituent X preferably denotes F, Cl, CN, a halogenated alkyl radical, halogenated alkoxy radical, halogenated alkenyl radical or halogenated alkenyloxy radical, each having up to 7 C atoms. In detail, X preferably denotes F, Cl, $CF_3$, $CHF_2$, $OCF_3$, $OCHF_2$, $OCFHCF_3$, $OCFHCHF_2$, $OCF_2CH_3$, $OCF_2CHF_2$, $OCF_2CF_3$, $OCFHCF_2CF_3$, $OCFHCF_2CHF_2$, $OCF_2CF_2CF_3$, $OCF_2CF_2CClF_2$, $OCClFCF_2CF_3$, $CH=CF_2$ or $OCH=CF_2$. X in the compounds of the formula I according to the invention very particularly preferably denotes a group from F, Cl, $CF_3$ or $OCF_3$, of these in particular F or Cl.

Preference is given to compounds of the formula I in which $L^3$ denotes fluorine.

Preference is given to compounds of the formula I in which m is 0.

Particularly preferred compounds of the formula I are the compounds of the formulae I1 to I6,

I1

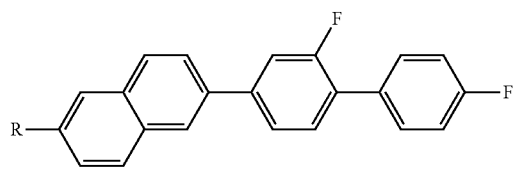

I2

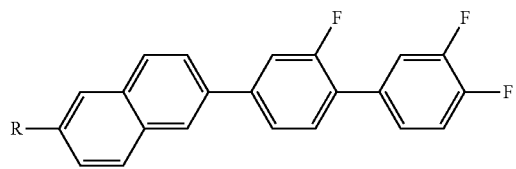

-continued

I3

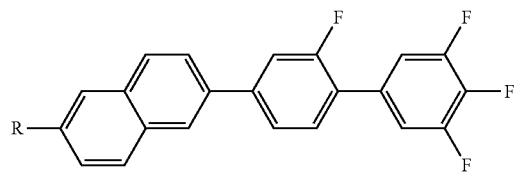

I4

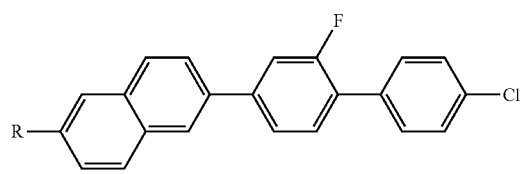

I5

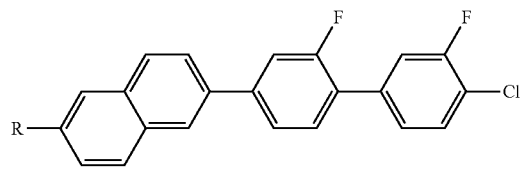

I6

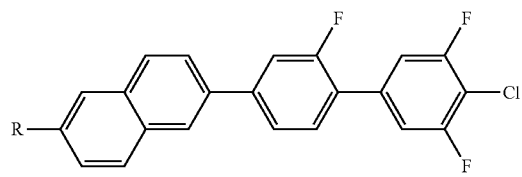

in which R independently has the meanings indicated above, in particular the preferred meanings or combinations thereof. Of the compounds of the formulae I1 to I8, the formulae I1, I2, I4 and I5 are preferred, in particular the compounds of the formulae I4 and I5.

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

Compounds of the formula I can advantageously be prepared as evident from the following illustrative synthesis and the examples (Scheme 1):

Scheme 1. General synthetic scheme for the preparation of compounds of the formula I.

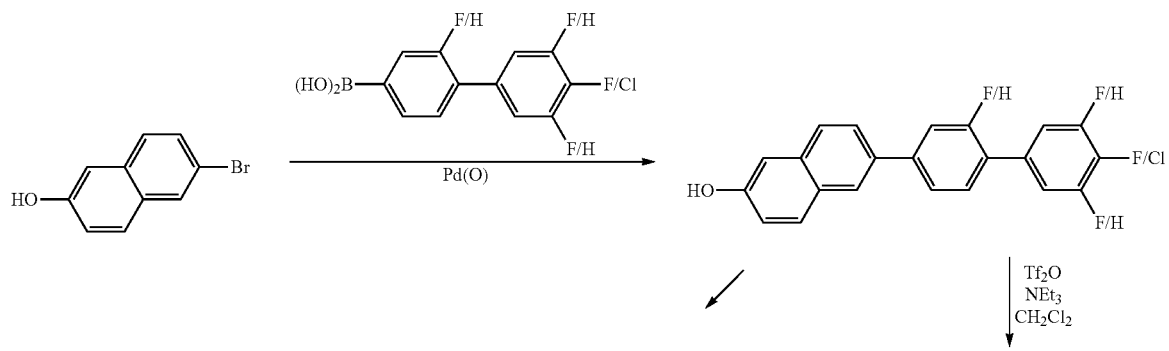

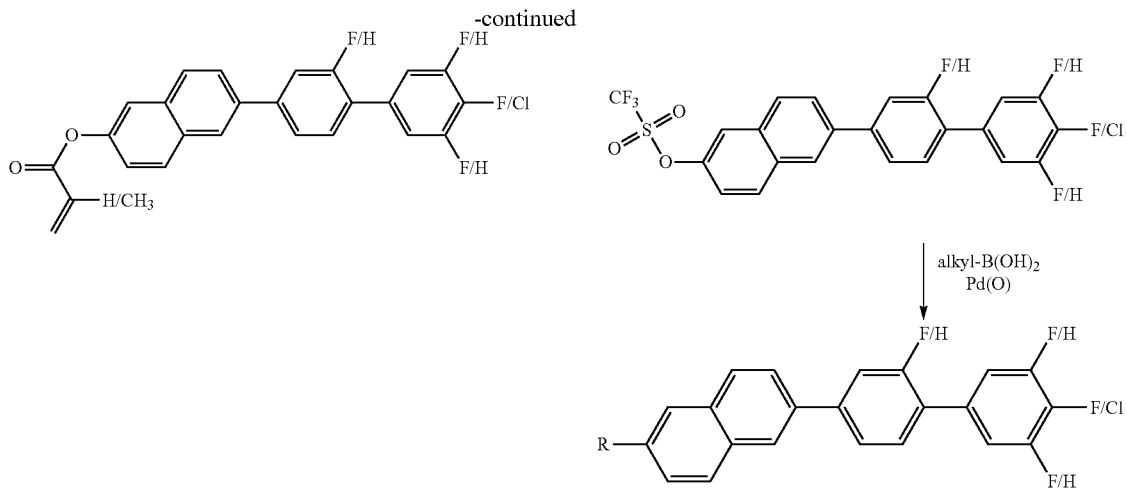

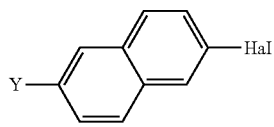

Corresponding starting materials can generally readily be prepared by the person skilled in the art via synthetic methods known from the literature. The synthesis of the biphenylboronic acid derivatives is carried out, for example, by metallation of corresponding halogen compounds and subsequent reaction with suitable simple boron compounds, such as, for example, trialkyl borates. After hydrolysis, the boronic acids are obtained for Suzuki coupling to halonaphthalenes.

Instead of the naphthalene bromides, it is also possible to use iodides, chlorides or leaving groups having comparable reactivity for the Suzuki coupling (for example the triflate group).

The invention therefore also relates to a process for the preparation of compounds of the formula I which includes a process step in which a boronic acid of the formula IIA or an open-chain or cyclic boronic acid ester of the formula IIB,

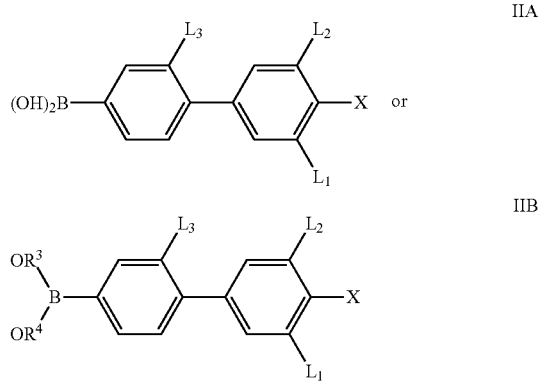

in which X, $L^1$, $L^2$ and $L^3$ are defined as for formula I, and
$R^3$, $R^4$ denote alkyl having 1-12 C atoms or $R^3+R^4$ together also denote alkylene having 2-10 C atoms, in particular of the formulae $—CH_2—(CH_2)_p—CH_2—$ and $—C(CH_3)_2C(CH_3)_2—$,
or 1,2-phenylene,
where phenylene, $R^3$, $R^4$ and $R^3+R^4$ may also be substituted and
where p is 0 or 1, is reacted with a compound of the formula III

III in which
Y denotes a group $R-(A-Z)_m—$ or OH,
in which R, A, Z and m independently are defined as for formula I and Hal denotes Cl, Br, I or $O(SO_2)CF_3$,
in the presence of a transition-metal catalyst, giving a compound of the formula I or a precursor thereof.

The transition-metal catalyst is preferably a palladium complex in oxidation state 0, II or IV. The reaction is preferably carried out in the homogeneous phase with a soluble catalyst. Catalysts for carrying out a Suzuki coupling to the products of the formula (I) are generally known. The catalysts preferably to be employed may also be generated in situ from common palladium(II) salts, such as, for example, palladium chloride, bromide, iodide, acetate or acrylacetonate, which may optionally be stabilised by further ligands, such as, for example, alkyl nitriles, or from Pd(0) species, such as palladium on activated carbon or tris(dibenzylideneacetone)dipalladium, together with phosphine ligands.

The complex employed is particularly preferably bis(triphenylphosphine)-palladium(II) chloride. The reaction methods and reagents used are described in detail in relevant publications.

The amount of catalyst employed is preferably from 0.01 mol % to 20 mol %, based on the aromatic or heteroaromatic starting material of the formula (II).

The process is preferably carried out in the presence of a base. The base employed in the Suzuki coupling is preferably selected from bases such as sodium hydroxide, sodium methoxide, sodium acetate, potassium fluoride, potassium phosphate or potassium carbonate.

Further reaction conditions are revealed by the working examples.

An alternative to the process described consists in exchanging the reactive groups of the reactants (boronic acid and halide).

Preference is given to a process in which Y is OH and the intermediate product from compounds of the formulae III and IIA or IIB is converted into a compound of the formula I in one or more further reaction steps (cf. Scheme 1).

Further preferred process variants not mentioned above are revealed by the examples or claims.

The invention also relates to liquid-crystalline media comprising one or more of the compounds of the formula I according to the invention. The liquid-crystalline media comprise at least two components. They are preferably obtained by mixing the components with one another. A process according to the invention for the preparation of a liquid-crystalline medium is therefore characterised in that at least one compound of the formula I is mixed with at least one further mesogenic compound, and additives are optionally added.

The achievable combinations of clearing point, viscosity at low temperature, thermal and UV stability and dielectric anisotropy are far superior to previous materials from the prior art.

The liquid-crystalline media according to the invention preferably comprise 2 to 40, particularly preferably 4 to 30, components as further constituents besides one or more compounds according to the invention. In particular, these media comprise 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexanes, 1,4-biscyclohexylbenzenes, 4,4'-biscyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of the media according to the invention can be characterised by the formulae 1, 2, 3, 4 and 5:

R'-L-E-R"   1

R'-L-COO-E-R"   2

R'-L-CF$_2$O-E-R"   3

R'-L-CH$_2$CH$_2$-E-R"   4

R'-L-C≡C-E-R"   5

In the formulae 1, 2, 3, 4 and 5, L and E, which may be identical or different, each, independently of one another, denote a divalent radical from the group formed by the structural elements -Phe-, -Cyc-, -Phe-Phe-, -Phe-Cyc-, -Cyc-Cyc-, -Pyr-, -Dio-, -Py-, -G-Phe-, -G-Cyc- and their mirror images, where Phe denotes unsubstituted or fluorine-substituted 1,4-phenylene, Cyc denotes trans-1,4-cyclohexylene, Pyr denotes pyrimidine-2,5-diyl or pyridine-2,5-diyl, Dio denotes 1,3-dioxane-2,5-diyl, Py denotes tetrahydropyran-2,5-diyl and G denotes 2-(trans-1,4-cyclohexyl)ethyl.

One of the radicals L and E is preferably Cyc, Phe or Pyr. E is preferably Cyc, Phe or Phe-Cyc. The media according to the invention preferably comprise one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe, Py and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G-Cyc-.

R' and/or R" each, independently of one another, denote alkyl, alkenyl, alkoxy, alkoxyalkyl, alkenyloxy or alkanoyloxy having up to 8 C atoms, —F, —Cl, —CN, —NCS or —(O)$_i$CH$_{3-k}$F$_k$, where i is 0 or 1 and k is 1, 2 or 3.

In a smaller sub-group of the compounds of the formulae 1, 2, 3, 4 and 5, R' and R" each, independently of one another, denote alkyl, alkenyl, alkoxy, alkoxyalkyl, alkenyloxy or alkanoyloxy having up to 8 C atoms. This smaller sub-group is called group A below, and the compounds are referred to by the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5, which is referred to as group B, R" denotes —F, —Cl, —NCS or —(O)$_i$CH$_{3-k}$F$_k$, where i is 0 or 1 and k is 1, 2 or 3. The compounds in which R" has this meaning are referred to by the sub-formulae 1b, 2b, 3b, 4b and 5b. Particular preference is given to those compounds of the sub-formulae 1b, 2b, 3b, 4b and 5b in which R" has the meaning —F, —Cl, —NCS, —CF$_3$, —OCHF$_2$ or —OCF$_3$.

In the compounds of the sub-formulae 1b, 2b, 3b, 4b and 5b, R' has the meanings indicated in the case of the compounds of the sub-formulae 1a to 5a and is preferably alkyl, alkenyl, alkoxy or alkoxyalkyl.

In a further smaller sub-group of the compounds of the formulae 1, 2, 3, 4 and 5, R" denotes —CN. This sub-group is referred to below as group C, and the compounds of this sub-group are correspondingly described by subformulae 1c, 2c, 3c, 4c and 5c. In the compounds of the sub-formulae 1c, 2c, 3c, 4c and 5c, R' has the meanings indicated in the case of the compounds of the sub-formulae 1a to 5a and is preferably alkyl, alkoxy or alkenyl.

Besides the preferred compounds of groups A, B and C, other compounds of the formulae 1, 2, 3, 4 and 5 having other variants of the proposed substituents are also customary. All these substances are obtainable by methods which are known from the literature or analogously thereto.

Besides compounds of the formula I according to the invention, the media according to the invention preferably comprise one or more compounds selected from groups A, B and/or C. The proportions by weight of the compounds from these groups in the media according to the invention are preferably:

group A: 0 to 90%, preferably 20 to 90%, particularly preferably 30 to 90%;

group B: 0 to 80%, preferably 10 to 80%, particularly preferably 10 to 65%;

group C: 0 to 80%, preferably 0 to 80%, particularly preferably 0 to 50%;

where the sum of the proportions by weight of the group A, B and/or C compounds present in the respective media according to the invention is preferably 5 to 90% and particularly preferably 10 to 90%.

The media according to the invention preferably comprise 1 to 40%, particularly preferably 5 to 30%, of the compounds according to the invention.

The liquid-crystal mixtures according to the invention are prepared in a manner which is conventional per se. In general, the desired amount of the components used in lesser amount is dissolved in the components making up the principal constituent, preferably at elevated temperature. It is also possible to mix solutions of the components in an organic solvent, for example in acetone, chloroform or methanol, and to remove the solvent again, for example by distillation, after thorough mixing. It is furthermore possible to prepare the mixtures in other conventional manners, for example by using premixes, for example homologue mixtures, or using so-called "multibottle" systems.

The dielectrics may also comprise further additives known to the person skilled in the art and described in the literature. For example, 0 to 15%, preferably 0 to 10%, of pleochroic dyes, chiral dopants, stabilisers or nano-particles can be added. The individual compounds added are employed in concentrations of 0.01 to 6%, preferably 0.1 to 3%. However, the concentration data of the other constituents of the liquid-crystal mixtures, i.e. the liquid-crystalline or mesogenic compounds, are given here without taking into account the concentration of these additives.

The liquid-crystal mixtures according to the invention enable a significant broadening of the available parameter latitude.

The invention also relates to electro-optical displays (in particular TFT displays having two plane-parallel outer plates, which, together with a frame, form a cell, integrated non-linear elements for switching individual pixels on the outer plates, and a nematic liquid-crystal mixture having positive dielectric anisotropy and high specific resistance located in the cell) which contain media of this type, and to the use of these media for electro-optical purposes.

The expression "alkyl" encompasses unbranched and branched alkyl groups having 1-9 carbon atoms, in particular the unbranched groups methyl, ethyl, propyl, butyl, pentyl, hexyl and heptyl. Groups having 2-5 carbon atoms are generally preferred.

The expression "alkenyl" encompasses unbranched and branched alkenyl groups having up to 9 carbon atoms, in particular the unbranched groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The expression "halogenated alkyl radical" preferably encompasses mono- or polyfluorinated and/or -chlorinated radicals. Perhalogenated radicals are included. Particular preference is given to fluorinated alkyl radicals, in particular $CF_3$, $CH_2CF_3$, $CH_2CHF_2$, $CHF_2$, $CH_2F$, $CHFCF_3$ and $CF_2CHFCF_3$. The expression "halogenated alkenyl radical" and related expressions are explained correspondingly.

The total amount of compounds of the formula I in the mixtures according to the invention is not crucial. The mixtures may therefore comprise one or more further components for the purposes of optimisation of various properties.

The construction of the matrix display according to the invention from polarisers, electrode base plates and surface-treated electrodes corresponds to the usual design for displays of this type. The term usual design is broadly drawn here and also encompasses all derivatives and modifications of the matrix display, in particular also matrix display elements based on poly-Si TFTs.

A significant difference between the displays according to the invention and the hitherto conventional ones based on the twisted nematic cell consists, however, in the choice of the liquid-crystal parameters of the liquid-crystal layer.

The following examples are intended to explain the invention without restricting it. The person skilled in the art will be able to glean from the examples working details that are not given in detail in the general description, generalise them in accordance with general expert knowledge and apply them to a specific problem.

Above and below, percentage data denote percent by weight. All temperatures are indicated in degrees Celsius. Furthermore, C=crystalline state, N=nematic phase, Sm=smectic phase and I=isotropic phase. The data between these symbols represent the transition temperatures. Δn denotes optical anisotropy (589 nm, 20° C.), Δε the dielectric anisotropy (1 kHz, 20° C.) and $\gamma_1$ the rotational viscosity (20° C.; in the unit mPa·s).

The physical, physicochemical and electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt.

The dielectric anisotropy Δε of the individual substances is determined at 20° C. and 1 kHz. To this end, 5-10% by weight of the substance to be investigated are measured dissolved in the dielectrically positive mixture ZLI-4792 (Merck KGaA), and the measurement value is extrapolated to a concentration of 100%. The optical anisotropy Δn is determined at 20° C. and a wavelength of 589.3 nm, the rotational viscosity $\gamma_1$ at 20° C., both likewise by linear extrapolation.

In the present application, unless expressly indicated otherwise, the plural form of a term denotes both the singular form and the plural form, and vice versa. Further combinations of the embodiments and variants of the invention in accordance with the description also arise from the appended claims.

The following abbreviations are used:
MTB methyl tert-butyl ether
DCM dichloromethane 1.1 SYNTHESIS OF 2-HYDROXY-6-(2-FLUORO-4'-CHLORO-1,1'-BIPHENYL)NAPHTHALENE

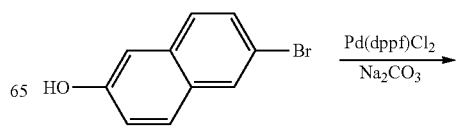

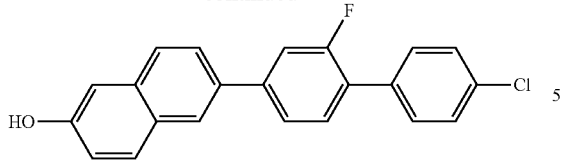

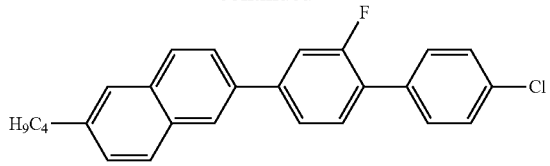

70 g (314 mmol) of 2-bromo-6-naphthol and 92.3 g (369 mmol) of 4'-chloro-2-fluoro-1,1'-biphenyl-4-boronic acid are initially introduced in a mixture of 600 ml of 1,4-dioxane and 300 ml of water, 65 g (613 mmol) of sodium carbonate and 6.7 g (9 mmol) of [1,1'-bis(diphenylphosphino)-ferrocene]palladium(II) dichloride are added, and the mixture is refluxed for 16 h.

The batch is cooled, MTB, water and 1 M aqueous hydrochloric acid are added, and the phases are separated. The aqueous phase is extracted twice with MTB, the combined organic phases are washed with saturated sodium chloride solution, dried over sodium sulfate, filtered and evaporated in a rotary evaporator. The residue is purified by column chromatography ($SiO_2$, DCM) and subsequently washed by stirring with hot isopropanol, giving the product as a sand-coloured solid.

1.2 SYNTHESIS OF 2-TRIFLUOROMETHANE-SULFONYL-6-(2-FLUORO-4'-CHLORO-1,1'-BIPHENYL)NAPHTHALENE

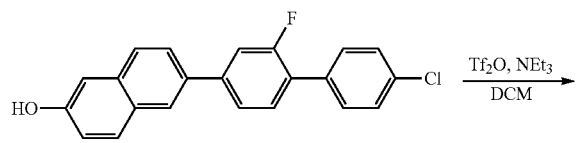

50 g (140 mmol) of the aromatic alcohol obtained in the preceding reaction are initially introduced in 450 ml of DCM and 27 ml (195 mmol) of triethylamine, 340 mg (2.8 mmol) of 4-(dimethylamino)pyridine are added, and 47 g (168 mmol) of trifluoromethanesulfonic anhydride are then added dropwise at 0° C. After 16 h, the mixture is worked up by addition of water. The phases are separated, and the organic phase is dried over sodium sulfate, filtered and evaporated in a rotary evaporator. The residue is purified by column chromatography ($SiO_2$, heptane→heptane/DCM=1:1), giving the product as a yellow solid.

1.3 SYNTHESIS OF 2-BUTYL-6-(2-FLUORO-4'-CHLORO-1,1'-BIPHENYL)NAPHTHALENE

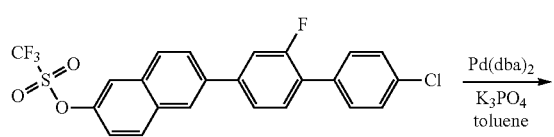

13.9 g (60 mmol) of potassium phosphate are initially introduced in 100 ml of toluene, and 4.4 g (42 mmol) of butylboronic acid, 345 mg (0.6 mmol) of bis(dibenzylideneacetone)palladium(0) and 254 mg (0.6 mmol) of 2-dicyclohexylphosphino-2',6'-dimethoxybiphenyl are added. 15 g (31 mmol) of the triflate obtained in the preceding reaction are added, and the mixture is refluxed for 18 h. The mixture is worked up by addition of MTB and water, the phases are separated, and the aqueous phase is extracted twice with MTB. The combined organic phases are washed with saturated sodium chloride solution, dried over sodium sulfate, filtered and evaporated in a rotary evaporator. The residue is purified by column chromatography ($SiO_2$, heptane/toluene=9:1); the further purification is carried out by recrystallisation from isopropanol/toluene and from heptane/toluene mixtures. The desired product is obtained as a colourless crystalline solid.

MS (EI): m/e (%)=388 (100, M$^+$), 345 (94, [M-propyl]$^+$).
C 113 SmA 200 N 248 I
$\Delta\varepsilon$=11.8
$\Delta n$=0.338
$\gamma_1$=1785 mPa·s The following were synthesised in an analogous or comparable manner:

2. 2-BUTYL-6-(2-FLUORO-3'-FLUORO-4'-CHLORO-1,1'-BIPHENYL)NAPHTHALENE

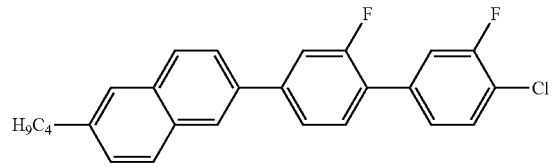

MS (EI): m/e (%)=406 (84, M$^+$), 363 (100, [M-propyl]$^+$).
Tg−33 C 62 SmA 168 N 208 I
$\Delta\varepsilon$=10.5
$\Delta n$=0.322
$\gamma_1$=1392 mPa·s

3. 2-PROPOXY-6-(2-FLUORO-3'-FLUORO-4'-CHLORO-1,1'-BIPHENYL)NAPHTHALENE

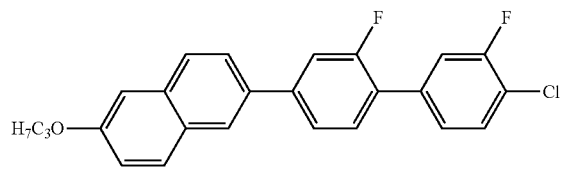

MS (EI): m/e (%)=408 (56, M$^+$), 366 (100, [M-$C_3H_6$]$^+$).
C 112 SmA 193 N 246 I

Δε=+9.9
Δn=0.35
γ₁=3156 mPa·s

4. 2-BUTYL-6-(2-FLUORO-3',4'-DIFLUORO-1,1'-BIPHENYL)NAPHTHALENE

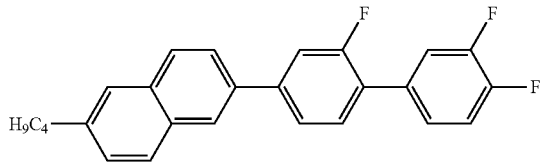

MS (EI): m/e (%)=390 (85, M⁺), 347 (100, [M-propyl]⁺).
C 69 SmA 148 N 179 I
Δε=10.3
Δn=0.291
γ₁=836 mPa·s

5. 2-METHOXY-6-(2,3',4'-TRIFLUORO-1,1'-BIPHENYL)NAPHTHALENE

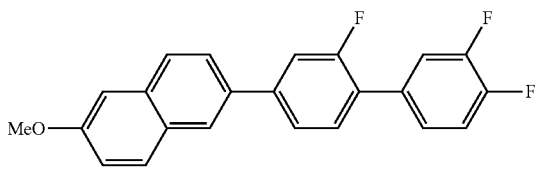 [SMILES: COc1ccc2cc(-c3ccc(-c4ccc(F)c(F)c4)c(F)c3)ccc2c1]

MS (EI): m/e (%)=364 (100, M⁺), 321 (44, [M-C₃H₆]⁺).
C 134 N 235 I

6. SYNTHESIS OF 2-(METHACRYLOYL)OXO-6-(2-FLUORO-4'-CHLORO-1,1'-BIPHENYL)-NAPHTHALENE

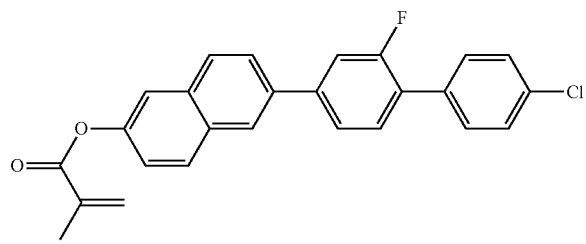 [SMILES: C=C(C)C(=O)Oc1ccc2cc(-c3ccc(-c4ccc(Cl)cc4)c(F)c3)ccc2c1]

9.5 g (27 mmol) of 2-hydroxy-6-(2-fluoro-4'-chloro-1,1'-biphenyl)naphthalene, 3.3 g (38 mmol) of methacrylic acid and 33 mg (2.7 mmol) of 4-(dimethylamino)pyridine are initially introduced in 100 ml of dichloromethane, the mixture is cooled to 0° C., and 6.1 g (39 mmol) of 1-ethyl-3-[3-dimethylaminopropyl]carbodiimide in 20 ml of dichloromethane are then added. The mixture is stirred for 18 h, warmed to room temperature in the process and subsequently worked up by direct filtration (SiO₂, heptane/dichloromethane=1:1). The further purification is carried out by recrystallisation from acetonitrile/toluene and from ethyl acetate/tetrahydrofuran mixtures. The desired product is obtained as a colourless crystalline solid.

MS (EI): m/e (%)=416 (52, M⁺), 69 (100, [CH₃C(=CH₂)C=O]⁺).
C 144 SmA 203 N decomp.

Further combinations of the embodiments and variants of the invention in accordance with the description also arise from the following claims.

The invention claimed is:

1. Compounds of the formula I,

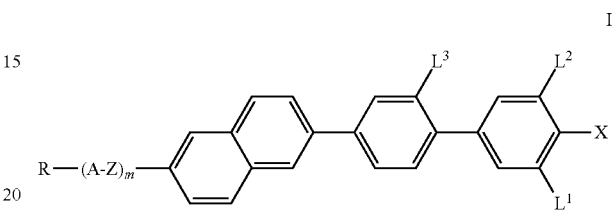

in which

X denotes Cl,

R denotes a halogenated or unsubstituted alkyl radical having 1 to 15 C atoms, where, in addition, one or more CH₂ groups in the halogenated or unsubstituted alkyl radical having 1 to 15 C atoms may each be replaced, independently of one another, by —C≡C—, —CH=CH—, —(CO)O—, —O(CO)—, —(CO)— or —O— in such a way that O atoms are not linked directly to one another, or a polymerisable radical, A denotes
   a) trans-1,4-cyclohexylene or cyclohexenylene, in which, in addition, one or more non-adjacent CH₂ groups may be replaced by —O— and/or —S— and in which H may be substituted by F,
   b) 1,4-phenylene, in which one or two CH groups may be replaced by N and in which, in addition, one or more H atoms may be replaced by Br, Cl, F, CN, methyl, methoxy or a mono- or polyfluorinated methyl or methoxy group, Z denotes a single bond, —CH₂O—, —(CO)O—, —CF₂O—, —CH₂CH₂CF₂O—, —CF₂CF₂—, —CH₂CF₂—, —CH₂CH₂—, —(CH₂)₄—, —CH=CH—, —CH=CF—, —CF=CF— or —C≡C— wherein the asymmetrical definitions for Z may be oriented to any of both possible directions, L¹, L² and L³,
   independently of one another, denote H or F, and m denotes 0 or 1.

2. Compounds according to claim 1, characterised in that L³ denotes F.

3. Compounds according to claim 1, characterised in that R denotes alkyl, alkoxy, alkenyl or alkenyloxy having up to 8 carbon atoms or a polymerisable group.

4. Compounds according to claim 1, characterised in that L¹ denotes fluorine and L² denotes H.

5. Compounds according to claim 1, characterised in that L¹ and L² denote H.

6. Compounds according to claim 1 selected from the formulae:

I4
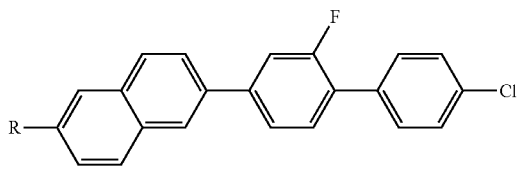

I5
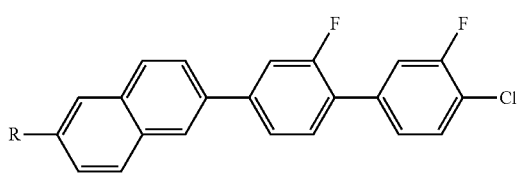

I6
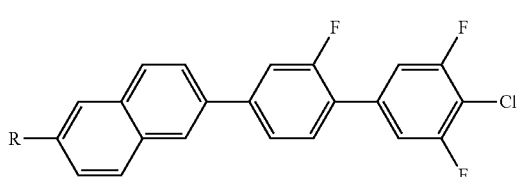

in which R has the meanings indicated in claim 1.

7. Process for the preparation of compounds of the formula I according to claim 1, including a process step in which a boronic acid of the formula IIA or an open-chain or cyclic boronic acid ester of the formula IIB,

IIA

IIB

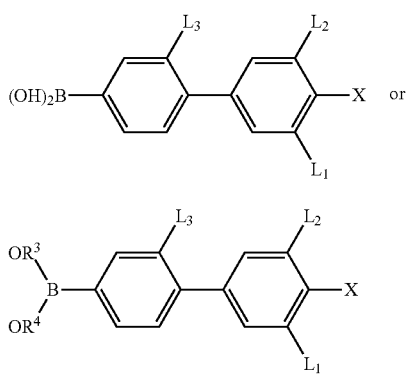

in which X, $L^1$, $L^2$ and $L^3$ are defined as in claim 1, and $R^3$, $R^4$ denote alkyl having 1-12 C atoms or $R^3+R^4$ together also denote alkylene or 1,2-phenylene,
where phenylene, $R^3$, $R^4$ and $R^3+R^4$ may also be substituted,
is reacted with a compound of the formula III

III

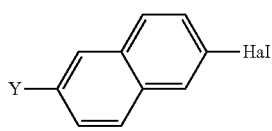

in which
Y denotes a group R-(A-Z)$_m$— or OH,
in which R, A, Z and m independently are defined as for formula I and
Hal denotes $O(SO_2)CF_3$, Cl, Br or I,
in the presence of a transition-metal catalyst.

8. The method comprising:
preparing a liquid-crystalline medium comprising at least one compound of the formula I according to claim 1.

9. A liquid-crystalline medium comprising at least two mesogenic compounds, characterised in that it comprises at least one compound of the formula I according to claim 1.

10. A method comprising including the liquid-crystalline medium according to claim 9 in an electro-optical device.

11. Electro-optical liquid-crystal display containing a liquid-crystalline medium according to claim 9.

12. Compounds of the formula I,

I

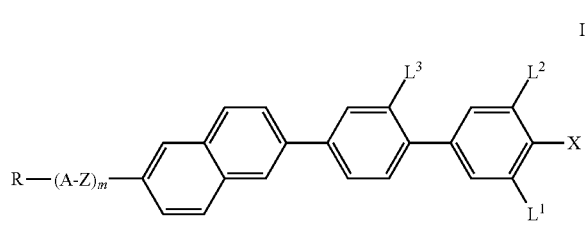

in which
X denotes F or Cl,
R denotes a halogenated or unsubstituted alkyl radical having 1 to 15 C atoms, where, in addition, one or more $CH_2$ groups in the halogenated or unsubstituted alkyl radical having 1 to 15 C atoms may each be replaced, independently of one another, by —C≡C—, —CH=CH—, —(CO)O—, —O(CO)—, —(CO)— or —O— in such a way that O atoms are not linked directly to one another, or a polymerisable radical,
A denotes
a) trans-1,4-cyclohexylene or cyclohexenylene, in which, in addition, one or more non-adjacent $CH_2$ groups may be replaced by —O— and/or —S— and in which H may be substituted by F,
b) 1,4-phenylene, in which one or two CH groups may be replaced by N and in which, in addition, one or more H atoms may be replaced by Br, Cl, F, CN, methyl, methoxy or a mono- or polyfluorinated methyl or methoxy group,
Z denotes a single bond, —$CH_2$O—, —(CO)O—, —$CF_2$O—, —$CH_2CH_2CF_2$O—, —$CF_2CF_2$—, —$CH_2CF_2$—, —$CH_2CH_2$—, —$(CH_2)_4$—, —CH=CH—, —CH=CF—, —CF=CF— or —C≡C—, wherein the asymmetrical definitions for Z may be oriented to any of both possible directions,
$L^1$, $L^2$ and $L^3$,
independently of one another, denote H or F, and
m denotes 0 or 1, and
wherein the compounds have liquid crystalline temperature range of at least 146 degrees C.

13. Compounds according to claim 12, wherein the compounds have an optical anisotropy Δn of at least 0.322.

* * * * *